US012436508B2

(12) United States Patent
Furuichi et al.

(10) Patent No.: US 12,436,508 B2
(45) Date of Patent: Oct. 7, 2025

(54) ASSISTANCE DEVICE, LEARNING DEVICE, AND PLANT OPERATION CONDITION SETTING ASSISTANCE SYSTEM (71) Applicant: CHIYODA CORPORATION, Yokohama (JP)

(72) Inventors: Kazuya Furuichi, Yokohama (JP); Eisuke Oki, Yokohama (JP); Shizuka Ikawa, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 1074 days.

(21) Appl. No.: 17/113,400

(22) Filed: Dec. 7, 2020

(65) Prior Publication Data
US 2021/0088986 A1 Mar. 25, 2021

Related U.S. Application Data (63) Continuation of application No. PCT/JP2018/022018, filed on Jun. 8, 2018.

(51) Int. Cl.
*G05B 13/02* (2006.01)
*G05B 13/04* (2006.01)
(Continued)

(52) U.S. Cl.
CPC ....... *G05B 13/0265* (2013.01); *G05B 13/048* (2013.01); *G06F 30/27* (2020.01); *G06N 20/00* (2019.01)

(58) Field of Classification Search
CPC .... G06F 30/27; G06N 20/00; G05B 13/0265; G05B 13/048; G05B 23/02; G06B 23/02
(Continued)

(56) References Cited

U.S. PATENT DOCUMENTS 4,563,746 A * 1/1986 Yoshida ................... G21D 3/00
376/217
5,581,459 A * 12/1996 Enbutsu ................. G06N 3/042
700/32
(Continued)

FOREIGN PATENT DOCUMENTS

EP 3296830 A1 * 3/2018 ......... G05B 23/0205
EP 3428744 A1 * 1/2019 ......... G05B 13/0265
(Continued)

OTHER PUBLICATIONS

Yin, S. Q. (2012). Proactive monitoring in process control using predictive trend displays. Doctoral thesis, Nanyang Technological University, Singapore. (Year: 2012).*
(Continued)

*Primary Examiner* — Chau T Nguyen
(74) *Attorney, Agent, or Firm* — CANTOR COLBURN LLP (57) ABSTRACT An operation condition setting support device supporting setting of an operation condition of a plant includes a state value acquirer acquiring state values representing states of controlled devices during operation of the controlled devices, a predictor estimating predicted values for the respective state values at a predetermined future time point based on the respective state values acquired by the state value acquirer, and a notifier, in a case where an index calculated based on a difference between each of the state values at the predetermined time point acquired by the state value acquirer and each of the predicted values at the predetermined time point or a later time point than the predetermined time point estimated by the predictor or a change ratio of the difference satisfies a predetermined condition, providing notification of the case.

9 Claims, 4 Drawing Sheets (51) Int. Cl.
*G06F 30/27* (2020.01)
*G06N 20/00* (2019.01)

(58) Field of Classification Search
USPC .......................................................... 706/12
See application file for complete search history.

(56) References Cited

U.S. PATENT DOCUMENTS

| | | | |
|---|---|---|---|
| 5,748,496 A | 5/1998 | Takahashi et al. | |
| 5,764,509 A * | 6/1998 | Gross .................. | G05B 23/0254 706/45 |
| 9,574,505 B2 * | 2/2017 | Nakada ................ | G05B 13/048 |
| 2006/0265158 A1 * | 11/2006 | Bandholz .............. | G06F 11/008 702/65 |
| 2008/0300698 A1 * | 12/2008 | Havekost ................ | H04L 67/75 700/83 |
| 2013/0147630 A1 * | 6/2013 | Nakaya .................. | G05D 23/00 340/691.6 |
| 2016/0202693 A1 | 7/2016 | Noda et al. | |
| 2016/0364510 A1 * | 12/2016 | Kashiwa ................ | G05B 17/02 |
| 2017/0243135 A1 | 8/2017 | Ooba et al. | |
| 2018/0046154 A1 * | 2/2018 | Kondo .................... | G05B 17/02 |
| 2018/0081350 A1 * | 3/2018 | Seki .................... | G05B 23/0267 |
| 2018/0142674 A1 * | 5/2018 | Hammerum ............ | F03D 7/045 |
| 2018/0196400 A1 * | 7/2018 | Kobayashi ............. | G06Q 50/06 |
| 2020/0333777 A1 * | 10/2020 | Maruyama ............... | G06N 7/01 |

FOREIGN PATENT DOCUMENTS

| | | |
|---|---|---|
| JP | H06347379 A | 12/1994 |
| JP | 2012098820 A | 5/2012 |
| JP | 2013145548 A | 7/2013 |
| JP | 2016128973 A | 7/2016 |
| RU | 2607992 C2 | 1/2017 |
| TW | 201024945 A | 7/2010 |
| TW | 201202876 A | 1/2012 |
| TW | 201816530 A | 5/2018 |
| TW | 201819061 A | 6/2018 |
| WO | 2015152317 A1 | 10/2015 |

OTHER PUBLICATIONS

Nadin, M. (2016). Anticipation and Computation: Is Anticipatory Computing Possible?. In: Nadin, M. (eds) Anticipation Across Disciplines. Cognitive Systems Monographs, vol. 29. Springer, Cham. (Year: 2016).*

Yuichiro et al. (Yuichiro), "Plant Facility Abnormality Diagnostic Device", published on Apr. 16, 2015, Document ID: JP-2015072512-A, pp. 6 (Year: 2015).*

Yoshihiro et al. (Yoshihiro), "Plant Operation Condition Setting Support System, Learning Device, and Operation Condition Setting Support Device", filed on Feb. 15, 2018, Document ID: WO-2019592280-A1, pp. 7 (Year: 2018).*

Ren et al. (Ren), "A method for evaluating subway transfer efficiency with the conventional process and method", published on Nov. 17, 2017, Document ID: CN-107358045 A, pp. 14 (Year: 2017).*

Indonesian Office Action corresponding to ID Application No. P00202009301; Mailing Date, Dec. 27, 2022.

GCC Patent Office Examination Report for corresponding GC Application No. 2019-37715; Dated Mar. 10, 2021.

ARIPO Examination Report for corresponding ARIPO Patent Application No. AP/P/2020/012892, Dated Dec. 1, 2021.

FIIP Office Action for corresponding RU Application No. 2020142981/28(080115); Dated Nov. 9, 2021.

FIIP Search Report for corresponding RU Application No. 2020142981/28(080115); Dated Nov. 9, 2021.

AUIP (Australian) Office Action for corresponding Application No. 2018426458; Issued on Aug. 9, 2023.

PCT International Preliminary Report on Patentability with Written Opinion of the International Searching Authority for International Application No. PCT/JP2018/022018; Date of Mailing, Dec. 17, 2020.

International Search Report for International Application No. PCT/JP2018/022018; Date of Mailing, Sep. 11, 2018.

TIPO 1st Office Action for corresponding TW Application No. 108110188; Dated Feb. 10, 2020.

* cited by examiner

ASSISTANCE DEVICE, LEARNING DEVICE, AND PLANT OPERATION CONDITION SETTING ASSISTANCE SYSTEM

CROSS REFERENCE TO PRIOR APPLICATIONS

This application is a continuation under 35 U.S.C. § 120 of PCT/JP2018/022018, filed Jun. 8, 2018, the entire content of which is also incorporated herein by reference.

BACKGROUND OF THE INVENTION

1. Field of the Invention

The present invention relates to a support device for supporting setting of operation conditions of a plant, a plant operation condition setting support system, and a learning device that can be used in the plant operation condition setting support system.

2. Description of the Related Art

In a plant for producing chemical products, industrial products, and the like, a series of processes are executed by multiple devices such as a reactor and a furnace, and operation conditions are set by various control amounts for controlling the multiple devices. In a plant in which multiple processes are executed, since the various control amounts can interact with each other in a complex manner, it is not easy to predict an influence of a change in control amount, and the plant is operated as the control amounts are set by a skilled operator.

In order for such a plant to be operated in a safe and stable manner, risk of the plant is required to be evaluated properly, and a risk evaluation technique with use of a method such as HAZOP (Hazard and Operability Studies) is proposed (for example, refer to patent document 1 and 2).

[patent document 1] JP2012-98820
[patent document 2] WO2015/152317

SUMMARY OF THE INVENTION

As disclosed in patent document 1 and 2, the conventional risk evaluation technique is used mainly at a stage of designing a plant, at a stage of reviewing operation conditions of the plant, or the like. Also, in recent years, the number of skilled operators decreases due to aging. The present inventors have arrived at the present invention upon recognizing requirement of a technique for applying a result of risk evaluation even during operation of a plant to support safe and stable operation of the plant.

The present invention is accomplished by taking such problems as mentioned above into consideration thereof, and an object thereof is to provide a technique for supporting setting of operation conditions enabling appropriate operation of a plant to be achieved.

To solve the above problem, a support device according to an aspect of the present invention includes a state value acquirer structured to acquire a plurality of state values representing states of a plurality of controlled devices during operation of the plurality of controlled devices, a predictor structured to predict predicted values for the plurality of respective state values at a predetermined future time point based on the plurality of state values acquired by the state value acquirer, and a notifier structured to, in a case in which an index calculated based on a difference between each of the state values at the predetermined time point acquired by the state value acquirer and each of the predicted values at the predetermined time point or a later time point than the predetermined time point estimated by the predictor or a change ratio of the difference satisfies a predetermined condition, provide notification of the case.

Another aspect of the present invention is a learning device. The learning device includes an evaluation acquirer structured to acquire a history of predicted values for a plurality of state values representing states of a plurality of controlled devices and actual values and evaluation for operation of a specific controlled device, and a learner structured to machine-learn based on the history and the evaluation an index calculation algorithm for calculating an index representing a magnitude of an influence which a difference between each of the predicted values for the plurality of state values and the actual values or a change ratio of the difference has on operation of the specific controlled device during operation of the plurality of controlled devices.

Still another aspect of the present invention is a plant operation condition setting support system. The plant operation condition setting support system includes a support device structured to support setting of an operation condition of a plant, and a learning device structured to learn an index calculation algorithm used in the support device. The support device includes a state value acquirer structured to acquire a plurality of state values representing states of a plurality of controlled devices during operation of the plurality of controlled devices included in the plant, a predictor structured to estimate predicted values for the plurality of respective state values at a predetermined future time point based on the plurality of state values acquired by the state value acquirer, and a notifier structured to, in a case in which an index calculated by means of an index calculation algorithm based on a difference between each of the state values at the predetermined time point acquired by the state value acquirer and each of the predicted values at the predetermined time point or a later time point than the predetermined time point estimated by the predictor or a change ratio of the difference satisfies a predetermined condition, provide notification of the case. The learning device includes an evaluation acquirer structured to acquire a history of the predicted values for the plurality of state values representing the states of the plurality of controlled devices and actual values and evaluation for operation of a specific controlled device, and a learner structured to learn the index calculation algorithm based on the history and the evaluation.

It is to be noted that arbitrary combination of the above components, and manners to express the present invention such as a method, an apparatus, a system, a recording medium, and a computer program are valid as aspects of the present invention.

DETAILED DESCRIPTION OF THE INVENTION

The invention will now be described by reference to the preferred embodiments. This does not intend to limit the scope of the present invention, but to exemplify the invention.

Figure 1:
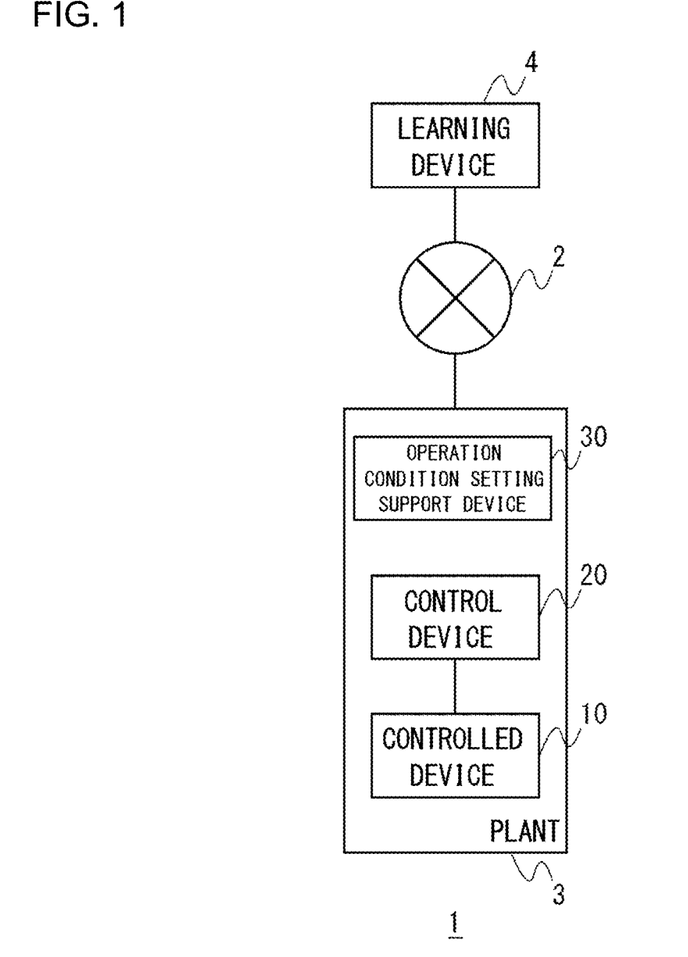
FIG. 1 illustrates an entire configuration of a plant operation condition setting support system according to an embodiment.

FIG. 1 illustrates an entire configuration of a plant operation condition setting support system according to an embodiment. A plant operation condition setting support system 1 includes a plant 3 adapted to produce chemical products, industrial products, and the like and a learning device 4 adapted to learn an algorithm used to support setting of operation conditions in the plant 3. The plant 3 and the learning device 4 are connected via an arbitrary communication network 2 such as the Internet and an in-house connection system and are operated in an arbitrary operation form such as on-premises and edge computing.

The plant 3 includes a controlled device 10, such as a reactor and a furnace, installed in the plant 3, a control device 20 setting control amounts for controlling operation conditions of the controlled device 10, and an operation condition setting support device 30 supporting setting of the operation conditions of the plant 3 with use of the algorithm learned by the learning device 4.

As described above, it is not easy to operate in a safe and stable manner the plant 3 in which processes constituted by the plurality of controlled devices 10 can interact with each other in a complex manner. In particular, when the plant 3 is activated or stopped, a different state from that during normal operation occurs, which is accompanied by a further difficulty. A skilled operator knows from his/her experiences a kind and a degree of importance of each of state values to be monitored preferentially among a plurality of state values representing states of the plant 3 when the operation of the plant 3 can be unstable. In a case in which such state values are abnormal and different from those in the past operation, the skilled operator attempts changes of control amounts to recover normal operation in accordance with a kind, a degree of importance, a change amount, a change ratio, and the like of each of the changed state values. The skilled operator then changes the plurality of control amounts by trial and error while carefully observing changes of the state values after the control amounts are changed to recover normal operation. Such an experience of the countermeasure against the abnormality is helpful in a countermeasure against similar subsequent abnormalities.

The plant operation condition setting support system 1 according to the present embodiment takes in such experiences of the skilled operator. When a state value to be monitored is abnormal and different from that in the past operation, the plant operation condition setting support system 1 calculates an index representing a degree of importance and a degree of urgency of the abnormality and presents the index to an operator in real time to appropriately support setting of operation conditions for safe and stable operation of the plant 3. Accordingly, even in a case in which an abnormality that can cause the plant 3 to be operated in an unstable manner occurs, the plant operation condition setting support system 1 can present to the operator a degree of importance and a degree of urgency of the abnormality as an objective index in real time and can thus support an appropriate countermeasure by the operator accurately.

In the plant operation condition setting support system 1 according to the present embodiment, as state values to be monitored are set a plurality of state values that can cause stop or failure of a specific controlled device (hereinbelow referred to as "a major device") that can cause severe damage or danger in a case in which the device stops or fails due to a certain cause among the plurality of controlled devices 10 operated in the plant 3.

First, to determine the plurality of state values to be monitored, causes for stop or failure of the major device are comprehensively extracted, and among these causes, a major cause that directly and immediately leads to stop or failure of the major device is identified. Subsequently, a fault tree analysis (FTA), in which the identified major cause is set as a top event, is conducted to find out occurrence causes, occurrence routes, and occurrence probabilities of lower-level events causing the top event. Through such an analysis, the plurality of state values to be monitored to restrict stop or failure of the major device during operation of the plant 3 are determined.

When the plurality of state values to be monitored are determined, an index calculation algorithm is prepared. In the index calculation algorithm, a difference between each of the state values in present operation and that in past operation or a change ratio of the difference is weighted in accordance with the occurrence probability of the state value, the occurrence route of the state value to the upper-level event, a magnitude of an influence of the major cause serving as the upper-level event on the operation of the major device, and the like. In the index calculation algorithm, from the difference between each of the state values in present operation and that in past operation or the change ratio of the difference, an index representing a degree of importance and a degree of urgency of the state value influencing the major device is calculated.

To calculate a numerical value for the difference between each of the plurality of state values to be monitored in past operation and that in present operation, during operation of the plant 3, a predicted value of each of the state values at a predetermined future time point is estimated based on a present value of each of the state values, and a difference between the predicted value for each of the state values at the predetermined time point or a later time point and the present value or a change ratio of the difference is calculated. The predetermined future time point for calculation of the predicted value may be determined in accordance with a kind of the controlled device 10 included in the plant 3, a kind of a process, a change ratio of a state value, speed at which the value for the state value changes due to a change of a value for a control amount, and the like and may be a time point several seconds to several minutes after the present time point, for example.

In the present embodiment, to accurately estimate the predicted value of each of the state values at the predetermined future time point, an estimation algorithm acquired by machine learning based on an actual past value of each of the plurality of state values is used. In another example, the predicted value may be calculated by using an equation, database, or the like set based on the actual past values.

As described above, according to the present embodiment, with use of artificial intelligence which has learned a skilled operator's individual experience systematically by means of machine learning, different operation from actual past operation can be detected promptly and appropriately, and an index representing a degree of importance and a degree of urgency of an influence of the operation on the major device can be presented to the operator in real time.

Consequently, it is possible to appropriately support appropriate setting of conditions for safe and stable operation of the plant 3 regardless of the operator's skills and experiences.

Figure 2:
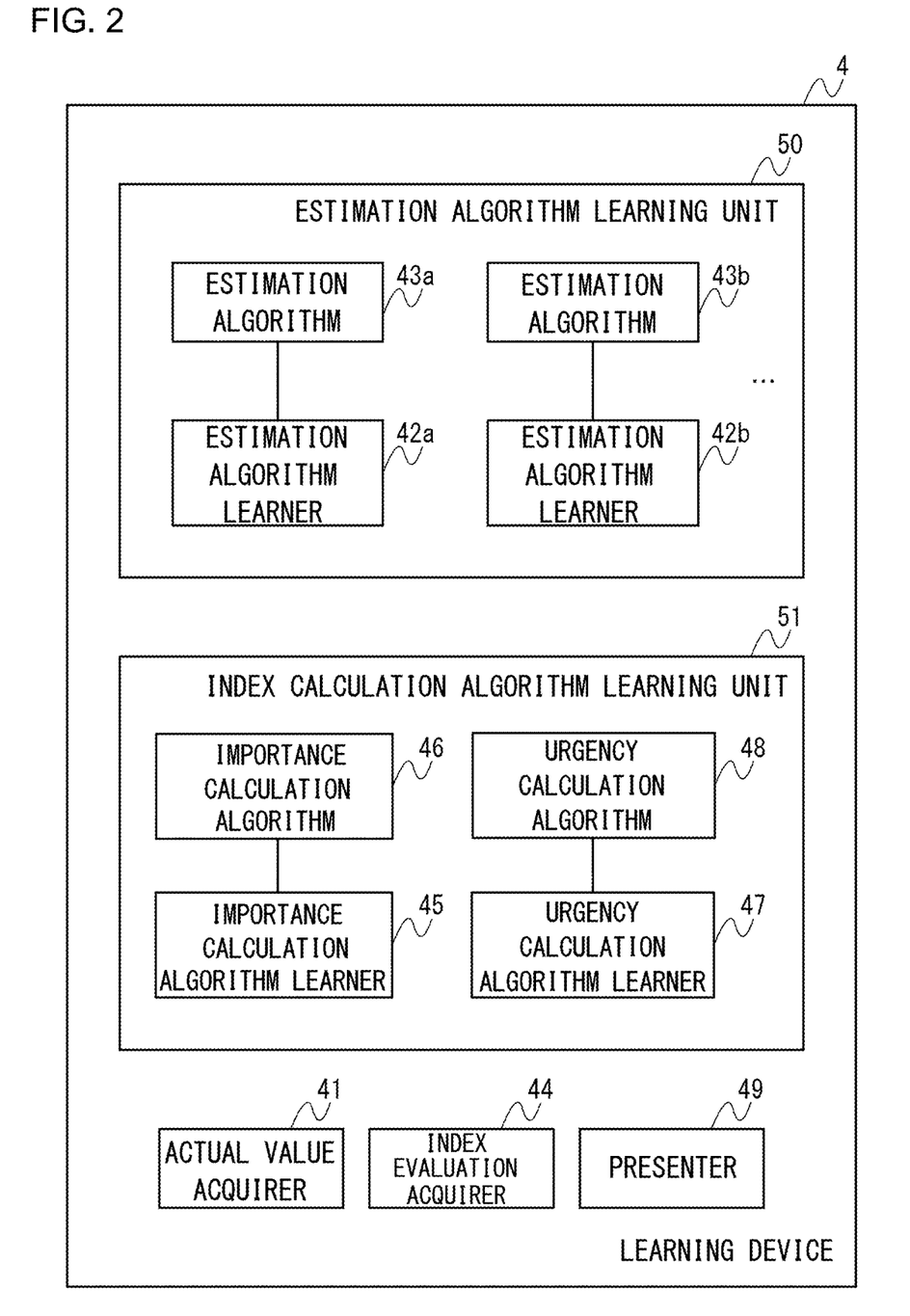
FIG. 2 illustrates a configuration of a learning device according to the embodiment.

FIG. 2 illustrates a configuration of the learning device according to the present embodiment. The learning device 4 includes an actual value acquirer 41, an estimation algorithm learning unit 50, an index evaluation acquirer 44, an index calculation algorithm learning unit 51, and a presenter 49. The functions of the components are fulfilled by hardware components such as a CPU and a memory, and a program loaded to the memory, of an arbitrary computer. The figure depicts functional blocks implemented by the cooperation of these elements. Therefore, it will be understood by those skilled in the art that the functional blocks may be implemented in a variety of manners by hardware only, software only, or by a combination of hardware and software.

The estimation algorithm learning unit 50 includes a plurality of estimation algorithms 43a, 43b, . . . for calculating respective predicted values of a plurality of state values that can cause stop or failure of the major device and a plurality of estimation algorithm learners 42a, 42b, . . . (hereinbelow collectively referred to as "an estimation algorithm learner 42") learning the plurality of respective estimation algorithms 43a, 43b, . . . (hereinbelow collectively referred to as "an estimation algorithm 43").

The estimation algorithm 43 is used to estimate predicted values of a plurality of state values, representing states of the plant 3, at a predetermined future time point based on the state values.

The actual value acquirer 41 acquires from the plant 3 respective actual past values for the plurality of state values and setting values for a plurality of control amounts.

The estimation algorithm learner 42 learns by means of machine learning the estimation algorithm 43 based on the respective actual past values for the plurality of state values and the setting values for the plurality of control amounts acquired by the actual value acquirer 41. The estimation algorithm learner 42 learns the estimation algorithm 43 so that, when the actual values for the plurality of state values and the setting values for the plurality of control amounts at a certain time point are input in the estimation algorithm 43, values close to the actual values for the plurality of state values at a time point after a predetermined period of time has passed since the time point may be calculated. The estimation algorithm learner 42 may learn the estimation algorithm 43 by means of supervised learning in which the actual past values acquired by the actual value acquirer 41 are set as training data or may learn the estimation algorithm 43 by means of another arbitrary known machine learning technique.

Since the estimation algorithm learner 42 learns the estimation algorithm 43 with use of multiple actual values to enable accuracy of the estimation algorithm 43 to be improved, the estimation algorithm 43 that can calculate predicted values of the state values representing the states of the plant 3 more accurately can be generated. Also, since an advanced simulator for reproducing a complicated process does not need to be developed, time and load required to generate the estimation algorithm 43 can drastically be reduced. Also, since elements that are difficult to be reproduced by the simulator can be reproduced, it is possible to calculate the predicted output values more accurately.

An index calculation algorithm is used to calculate an index representing a magnitude of an influence on operation of the major device and a degree of urgency based on a difference between a predicted value for each of the state values at a predetermined time point or a later time point than the predetermined time point and an actual state value at the predetermined time point or a change ratio of the difference. The index represents a degree of importance indicating a magnitude of an influence on the major device and a degree of urgency indicating urgency of an influence on the major device. On the degree of importance, a difference between a predicted value for each of the state values and an actual state value and a change ratio of the difference are mainly reflected. On the degree of urgency, a change ratio of a difference between a predicted value at a present time point for each of the state values and an actual state value at the present time point and a difference between a predicted value at a future time point for each of the state values and an actual state value at the present time point or a change ratio of the difference are reflected.

The index evaluation acquirer 44 acquires a history of predicted values calculated for the respective state values and actual state values and evaluation for operation of the major device. The evaluation for operation of the major device may be calculated based on the history of the state values or may be input by the operator. The index evaluation acquirer 44 may acquire a history of predicted values calculated for the respective state values and actual state values and evaluation for an index calculated by an importance calculation algorithm 46 and an urgency calculation algorithm 48. The evaluation for the index may be a result of evaluation by the operator.

The index calculation algorithm learning unit 51 includes the importance calculation algorithm 46 for calculating a degree of importance indicating a magnitude of an influence on the major device, an importance calculation algorithm learner 45 learning the importance calculation algorithm 46, the urgency calculation algorithm 48 for calculating a degree of urgency indicating urgency of an influence on the major device, and an urgency calculation algorithm learner 47 learning the urgency calculation algorithm 48.

The importance calculation algorithm learner 45 and the urgency calculation algorithm learner 47 respectively learn the importance calculation algorithm 46 and the urgency calculation algorithm 48 based on the history of predicted values and actual state values and the evaluation for operation of the major device acquired by the index evaluation acquirer 44. The importance calculation algorithm learner 45 and the urgency calculation algorithm learner 47 determine from evaluation for future operation of the major device whether or not the index calculated by substituting a difference between a predicted value at a predetermined time point or a later time point than the predetermined time point and a state value or a change ratio of the difference into the importance calculation algorithm 46 and the urgency calculation algorithm 48 based on the history of predicted values and actual state values and the evaluation for operation of the major device acquired by the index evaluation acquirer 44 precisely evaluates the degree of importance and the degree of urgency of the influence on operation of the major device. In a case in which the future operation of the major device is evaluated more poorly than predetermined operation, the importance calculation algorithm learner 45 and the urgency calculation algorithm learner 47 learn the importance calculation algorithm 46 and the urgency calculation algorithm 48 so that an index of a poorer value may be calculated, and in a case in which the future operation of the major device is evaluated better than the predetermined operation, the importance calculation algorithm learner 45 and the urgency calculation algorithm learner 47 learn the importance calculation algorithm 46 and the urgency calculation algorithm 48 so that an index of a better value may be calculated. In this manner, the importance calculation algorithm learner 45 and the urgency calculation algorithm learner 47 may learn the importance calculation algorithm 46 and the urgency calculation algorithm 48 by means of supervised learning in which the evaluation for the operation of the major device acquired by the index evaluation acquirer 44 are set as training data or may learn the importance calculation algorithm 46 and the urgency calculation algorithm 48 by means of another arbitrary known machine learning technique.

The index evaluation acquirer 44 may acquire as training data a value for an index that the operator has calculated or evaluated by himself/herself without depending on the importance calculation algorithm 46 and the urgency calculation algorithm 48. In this case, the importance calculation algorithm learner 45 and the urgency calculation algorithm learner 47 learn the importance calculation algorithm 46 and the urgency calculation algorithm 48 so that the value for the index acquired by the index evaluation acquirer 44 may be calculated when a difference between a predicted value at a predetermined time point or a later time point than the predetermined time point and a state value or a change ratio of the difference is input into the importance calculation algorithm 46 and the urgency calculation algorithm 48.

The presenter 49 presents to the operation condition setting support device 30 the estimation algorithm 43 learned by the estimation algorithm learner 42, and the importance calculation algorithm 46 and the urgency calculation algorithm 48 learned by the importance calculation algorithm learner 45 and the urgency calculation algorithm learner 47.

Since an event in which the major device stops rarely occurs, it is difficult to learn operation of the plant 3 in case of occurrence of such an event based on past occurrence of the event. However, in the present embodiment, a magnitude of an influence on operation of the major device is expressed as an index from a difference between past operation and present operation. Accordingly, even without actual occurrence of stop of the major device, it is possible to provide artificial intelligence enabling a state in which the major device can stop to be detected appropriately.

In the figures, although the learning device 4 is illustrated as a single device for simplification of description, the function of the learning device 4 may be fulfilled by a plurality of servers with use of a cloud computing technique, a distributed processing technique, or the like. Consequently, since a large amount of information collected from the plant 3 can be processed at high speed to cause the estimation algorithm 43, the importance calculation algorithm 46, and the urgency calculation algorithm 48 to be learned, time required to improve the accuracy of the estimation algorithm 43, the importance calculation algorithm 46, and the urgency calculation algorithm 48 can be shortened drastically.

Figure 3:
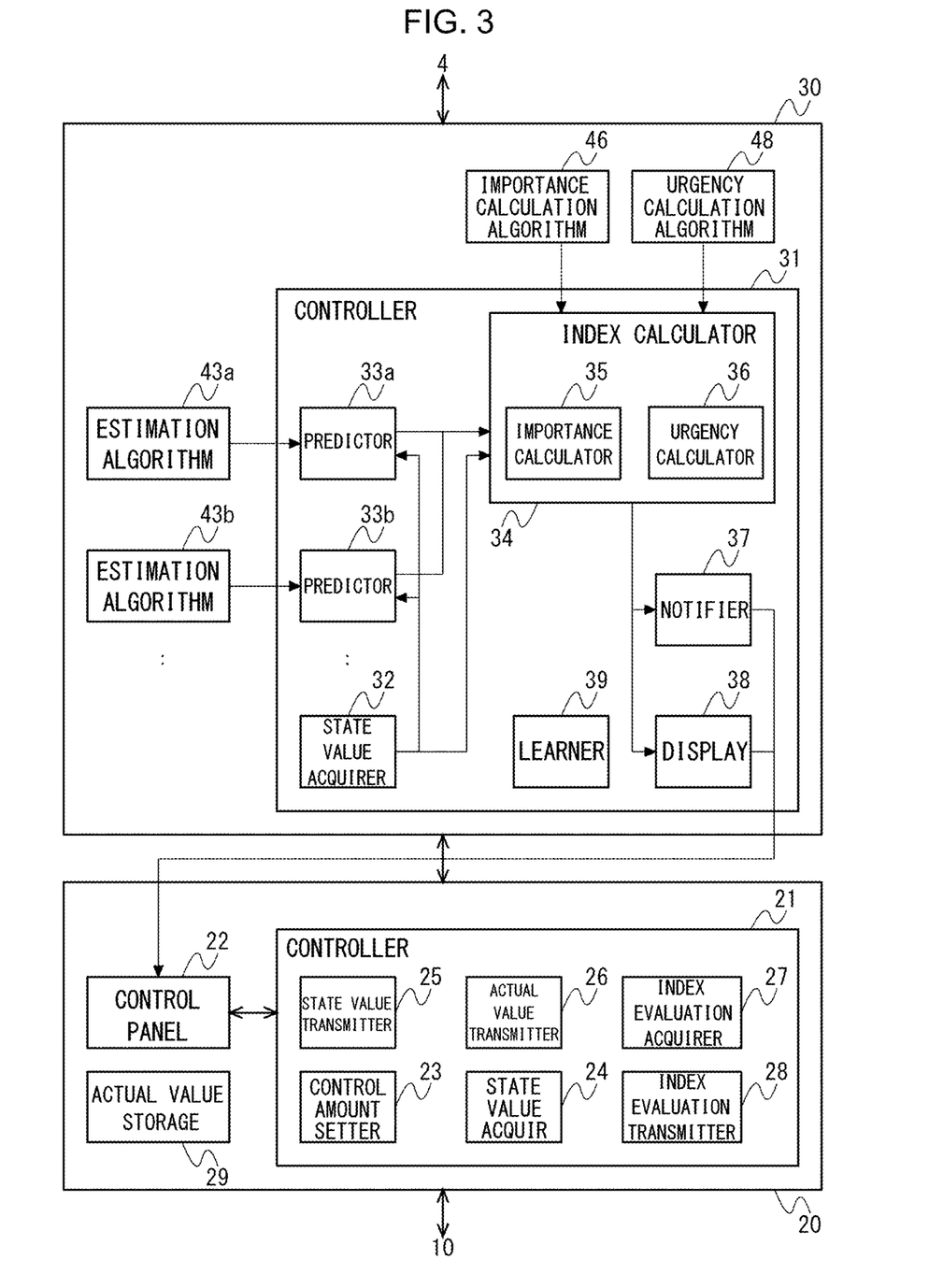
FIG. 3 illustrates configurations of an operation condition setting support device and a control device according to the embodiment.

FIG. 3 illustrates configurations of the operation condition setting support device and the control device according to the embodiment. The control device 20 includes a controller 21, a control panel 22, and an actual value storage 29.

The control panel 22 displays on a display device various state values representing operation states of the plant 3, setting values for various control amounts set by the control device 20, output values representing operation results of the plant 3, and the like and receives setting values for various control amounts input by the operator.

The controller 21 includes a control amount setter 23, a state value acquirer 24, a state value transmitter 25, an actual value transmitter 26, an index evaluation acquirer 27, and an index evaluation transmitter 28. These functional blocks can be fulfilled in various ways such as by hardware only, by software only, and by a combination thereof.

The control amount setter 23 sets setting values for various control amounts received from the operator through the control panel 22, controls the controlled device 10, and displays the values on the display device of the control panel 22. The state value acquirer 24 acquires various state values indicating operation states and operation results of the plant 3 from various sensors and measuring instruments installed in the controlled device 10 and the like, displays the state values on the display device of the control panel 22, and stores the state values in the actual value storage 29. The state value transmitter 25 transmits the state values acquired by the state value acquirer 24 to the operation condition setting support device 30. The actual value transmitter 26 transmits the values for the control amounts set by the control amount setter 23 and the state values stored in the actual value storage 29 to the learning device 4.

The index evaluation acquirer 27 acquires from the operator evaluation for the index displayed on the control panel 22. The index evaluation acquirer 27 may acquire from the operator evaluation indicating that the index displayed on the control panel 22 is too high or too low or may acquire from the operator a corrected value of the index displayed on the control panel 22. The index evaluation transmitter 28 transmits to the learning device 4 the evaluation for the index that the index evaluation acquirer 27 has acquired from the operator. The evaluation for the index is used for learning of the importance calculation algorithm 46 and the urgency calculation algorithm 48 in the learning device 4 as described above.

The operation condition setting support device 30 includes a controller 31, the estimation algorithm 43, the importance calculation algorithm 46, and the urgency calculation algorithm 48.

The controller 31 includes a state value acquirer 32, predictors 33a, 33b, . . . (hereinbelow collectively referred to as "a predictor 33"), an index calculator 34, a notifier 37, a display 38, and a learner 39. These functional blocks can be fulfilled in various ways such as by hardware only, by software only, and by a combination thereof.

The estimation algorithm 43, the importance calculation algorithm 46, and the urgency calculation algorithm 48 are acquired from the learning device 4 and are stored in a storage device.

The state value acquirer 32 acquires a plurality of state values from the state value transmitter 25 of the control device 20. The predictor 33 calculates predicted values for a plurality of respective state values at a predetermined future time point from the plurality of state values acquired by the state value acquirer 32 with use of the estimation algorithm 43 and stores the predicted values in the storage device.

The index calculator 34 includes an importance calculator 35 and an urgency calculator 36. The importance calculator 35 and the urgency calculator 36 calculates a difference between each of the state values acquired by the state value acquirer 32 and each of the predicted values for the state values calculated by the predictor 33 and stored in the storage device or a change ratio of the difference and calculates an index representing a degree of importance and a degree of urgency with use of the importance calculation algorithm 46 and the urgency calculation algorithm 48.

In a case in which the index calculated by the index calculator 34 satisfies predetermined conditions, the notifier 37 provides notification of the case. The notifier 37 may display the calculated index on the control panel 22 at all times during operation of the plant 3 to notify the operator of the index, or, in a case in which the index is a poorer value than a predetermined value, the notifier 37 may display the case on the control panel 22 to notify the operator of the case. Accordingly, it is possible to notify the operator of a case in which a state in which the major device can be influenced is occurring.

The display 38 displays on the control panel 22 a matrix in which the degree of importance on the vertical axis and the degree of urgency on the horizontal axis, calculated by the index calculator 34, are plotted. Accordingly, the degree of importance and the degree of urgency of an influence of a present state on the major device can be presented to the operator in a visually understandable manner. The display 38 displays on the control panel 22 the difference between each of the predicted values calculated for the plurality of state values and each of the state values or the change ratio of the difference. Accordingly, since it is possible to present to the operator which of the plurality of state values that can influence the major device is abnormal and a degree of abnormality of the state value, it is possible to appropriately present information that the operator is required to check to change a setting value for a control amount.

The learner 39 learns the estimation algorithm 43, the importance calculation algorithm 46, or the urgency calculation algorithm 48. The learner 39 may relearn the estimation algorithm 43, the importance calculation algorithm 46, or the urgency calculation algorithm 48 in a similar manner to those of the estimation algorithm learner 42, the importance calculation algorithm learner 45, or the urgency calculation algorithm learner 47 of the learning device 4. In a case in which the estimation algorithm 43, the importance calculation algorithm 46, or the urgency calculation algorithm 48 is relearned in the learning device 4, the learner 39 may not be provided.

Figure 4:
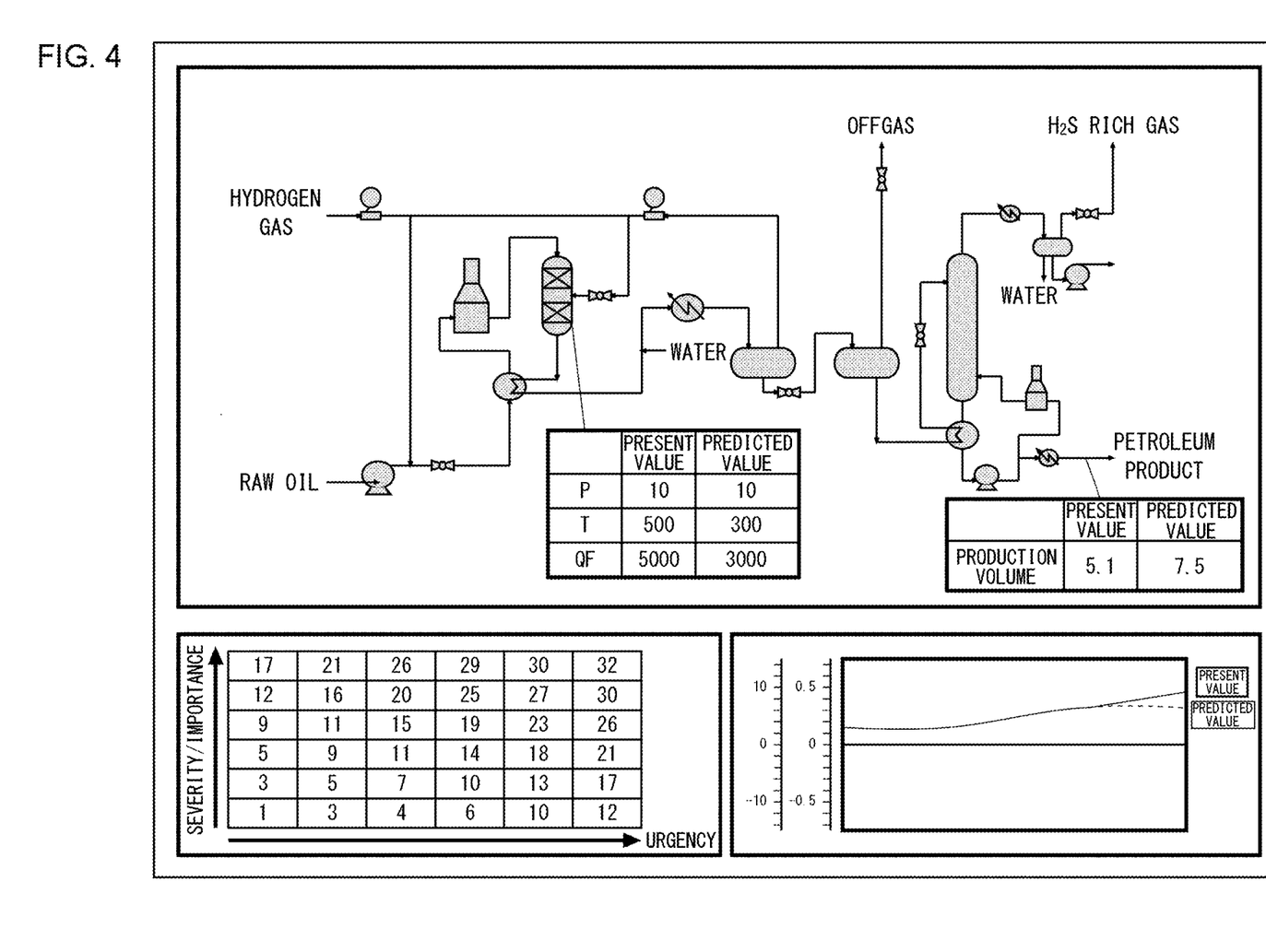
FIG. 4 illustrates an example of a display screen displayed on a display device of a control panel.

FIG. 4 illustrates an example of a display screen displayed on the display device of the control panel. On the display screen are displayed a process flow diagram of the plant 3, a plurality of state values, predicted values for the state values after a predetermined period of time, a matrix in which the degree of importance and the degree of urgency are plotted, and a transition of a state value. The operator determines setting values for control amounts with reference to the presented information and inputs the setting values on the control panel 22. The control amount setter 23 controls the controlled device 10 based on the input setting values.

The index calculator 34 calculates an index at predetermined intervals, and the display 38 plots the degree of importance and the degree of urgency of the index calculated at the predetermined intervals in the matrix. That is, the matrix of the degree of importance and the degree of urgency is updated in real time and presents a present state of the plant 3. Patent document 1 and 2 disclose matrix display. However, in each of the matrices, a degree of importance or a degree of influence is set on one axis while an occurrence frequency is set on the other axis. Each of the matrices is not displayed on the control panel 22 of the plant 3 and is not updated in real time. The matrix display and the transition of the state value and the predicted value according to the present embodiment are displayed on the control panel 22 at all times. Thus, in a case in which an abnormality occurs, the operator can change the setting values for the control amounts and control operation states of the plant 3 while checking the transition of the state value and the predicted value in real time.

The present invention has been described above based on the embodiment. It is to be understood by those skilled in the art that the present embodiment is illustrative, that combination of the respective components and the respective processes can have various modification examples, and that such modification examples are within the scope of the present invention.

The technique of the present invention is applicable not only to a plant employing a continuous process but also to a plant employing a batch process.

A support device according to an aspect of the present invention includes a state value acquirer structured to acquire a plurality of state values representing states of a plurality of controlled devices during operation of the plurality of controlled devices, a predictor structured to predict predicted values for the plurality of respective state values at a predetermined future time point based on the plurality of state values acquired by the state value acquirer, and a notifier structured to, in a case in which an index calculated based on a difference between each of the state values at the predetermined time point acquired by the state value acquirer and each of the predicted values at the predetermined time point or a later time point than the predetermined time point estimated by the predictor or a change ratio of the difference satisfies a predetermined condition, provide notification of the case.

According to the present aspect, in a case in which a different state value from a predicted value for the state value at a predetermined time point estimated from past operation is observed, the case can be notified to an operator to cause the operator to take an appropriate countermeasure. Accordingly, it is possible to appropriately support setting of appropriate operation conditions of a plant in real time in a similar manner to that of a skilled operator.

The predictor may estimate the predicted values by means of an estimation algorithm acquired by machine learning based on actual past values of the plurality of respective state values. According to the present aspect, since accuracy of estimating the predicted values for the state values at the predetermined future time point can be improved, different operation from past operation can be detected more accurately.

The support device may further include a calculator structured to calculate the index by means of a predetermined index calculation algorithm in which the difference or the change ratio of the difference is weighted based on a magnitude of an influence which the difference or the change ratio of the difference calculated for each of the respective state values has on operation of a specific controlled device. According to the present aspect, since an influence on operation of the specific controlled device can be expressed as an index and can be presented to the operator, it is possible to appropriately support setting of appropriate operation conditions of a plant in real time in a similar manner to that of a skilled operator.

The index calculation algorithm may be learned based on a history of actual values for the difference or the change ratio of the difference calculated for each of the state values and evaluation for operation of the specific controlled device. According to the present aspect, since an influence on operation of the specific controlled device can be expressed as an index more accurately and can be presented to the operator, it is possible to more appropriately support setting of appropriate operation conditions of a plant in real time in a similar manner to that of a skilled operator.

The support device may further include a learner structured to machine-learn the index calculation algorithm based on the history of the actual values for the difference or the change ratio of the difference calculated for each of the state values and the evaluation for operation of the specific controlled device. According to the present aspect, since an influence on operation of the specific controlled device can be expressed as an index more accurately and can be presented to the operator, it is possible to more appropriately support setting of appropriate operation conditions of a plant in real time in a similar manner to that of a skilled operator.

The index may represent a degree of importance indicating a magnitude of an influence on the specific controlled device and a degree of urgency indicating urgency of an influence on the specific controlled device. According to the present aspect, since an influence on operation of the specific controlled device can be expressed as an index by dividing the influence into the degree of importance and the degree of urgency and can be presented to the operator, it is possible to more appropriately support setting of appropriate operation conditions of a plant in real time in a similar manner to that of a skilled operator.

The support device may further include a display structured to display the degree of importance and the degree of urgency on a display device. The display may display a matrix in which the degree of importance on a vertical axis and the degree of urgency on a horizontal axis or vice versa are plotted. According to the present aspect, since the degree of importance and the degree of urgency for the influence on operation of the specific controlled device can be presented to the operator in a visually understandable manner, it is possible to more appropriately support setting of appropriate operation conditions of a plant in real time in a similar manner to that of a skilled operator.

The display may display on the display device the difference or the change ratio of the difference calculated for each of the plurality of respective state values. According to the present aspect, since the state value that can have an influence on operation of the specific controlled device can be presented to the operator, it is possible to more appropriately support setting of appropriate operation conditions of a plant in real time in a similar manner to that of a skilled operator.

Another aspect of the present invention is a learning device. The learning device includes an evaluation acquirer structured to acquire a history of predicted values for a plurality of state values representing states of a plurality of controlled devices and actual values and evaluation for operation of a specific controlled device, and a learner structured to machine-learn based on the history and the evaluation an index calculation algorithm for calculating an index representing a magnitude of an influence which a difference between each of the predicted values for the plurality of state values and the actual values or a change ratio of the difference has on operation of the specific controlled device during operation of the plurality of controlled devices.

According to the present aspect, in a case in which a different state value from a predicted value for the state value at a predetermined time point estimated from past operation is observed, the case can be notified to an operator to cause the operator to take an appropriate countermeasure. Accordingly, it is possible to appropriately support setting of appropriate operation conditions of a plant in real time in a similar manner to that of a skilled operator.

Still another aspect of the present invention is a plant operation condition setting support system. The plant operation condition setting support system includes a support device structured to support setting of an operation condition of a plant, and a learning device structured to learn an index calculation algorithm used in the support device. The support device includes a state value acquirer structured to acquire a plurality of state values representing states of a plurality of controlled devices during operation of the plurality of controlled devices included in the plant, a predictor structured to estimate predicted values for the plurality of respective state values at a predetermined future time point based on the plurality of state values acquired by the state value acquirer, and a notifier structured to, in a case in which an index calculated by means of an index calculation algorithm based on a difference between each of the state values at the predetermined time point acquired by the state value acquirer and each of the predicted values at the predetermined time point or a later time point than the predetermined time point estimated by the predictor or a change ratio of the difference satisfies a predetermined condition, provide notification of the case. The learning device includes an evaluation acquirer structured to acquire a history of the predicted values for the plurality of state values representing the states of the plurality of controlled devices and actual values and evaluation for operation of a specific controlled device, and a learner structured to learn the index calculation algorithm based on the history and the evaluation.

According to the present aspect, in a case in which a different state value from a predicted value for the state value at a predetermined time point estimated from past operation dealt with by a skilled operator is observed, the case can be notified to an operator to cause the operator to take an appropriate countermeasure. Accordingly, it is possible to appropriately support setting of appropriate operation conditions of a plant in real time in a similar manner to that of a skilled operator.

What is claimed is:

1. A support device comprising:
    a state value acquirer structured to acquire a plurality of state values representing states of a plurality of controlled devices during operation of the plurality of controlled devices;
    a predictor structured to estimate predicted values for the plurality of respective state values at a predetermined future time point based on the plurality of respective state values acquired by the state value acquirer;
    a notifier structured to, in a case where an index calculated based on a difference between each of the state values at the predetermined time point acquired by the state value acquirer and each of the predicted values at the predetermined time point or a later time point than the predetermined time point estimated by the predictor or a change ratio of the difference satisfies a predetermined condition, provide notification of the case; and
    a calculator structured to calculate the index by means of a predetermined index calculation algorithm in which the difference or the change ratio of the difference is weighted respectively based on a magnitude of an influence which the difference or the change ratio of the difference calculated for each of the respective state values has on operation of a specific controlled device,
    wherein the index includes a degree of importance indicating a magnitude of an influence on the specific controlled device and a degree of urgency indicating urgency of an influence on the specific controlled device.

2. The support device according to claim 1, wherein the predictor estimates the predicted values by means of an estimation algorithm acquired by machine learning based on actual past values of the plurality of respective state values.

3. The support device according to claim 1, wherein the index calculation algorithm is learned based on a history of the predicted values calculated for the respective state values and actual values and evaluation for operation of the specific controlled device.

4. The support device according to claim 3, further comprising:
   a learner structured to machine-learn the index calculation algorithm based on the history of the predicted values calculated for the respective state values and the actual values and the evaluation for operation of the specific controlled device.

5. The support device according to claim 1, further comprising:
   a display structured to display the degree of importance and the degree of urgency on a display device.

6. The support device according to claim 5, wherein the display displays a matrix in which the degree of importance on a vertical axis and the degree of urgency on a horizontal axis or vice versa are plotted.

7. The support device according to claim 5, wherein the display displays on the display device the difference or the change ratio of the difference calculated for each of the plurality of respective state values.

8. A learning device comprising:
   an index evaluation acquirer structured to acquire a history of predicted values for a plurality of state values representing states of a plurality of controlled devices and actual values and evaluation for operation of a specific controlled device; and
   a learner structured to machine-learn based on the history and the evaluation an index calculation algorithm for calculating an index representing a magnitude of an influence which a difference between each of the predicted values for the plurality of state values and the actual values or a change ratio of the difference has on operation of the specific controlled device during operation of the plurality of controlled devices,
   wherein the index includes a degree of importance indicating a magnitude of an influence on the specific controlled device and a degree of urgency indicating urgency of an influence on the specific controlled device.

9. A plant operation condition setting support system comprising:
   a support device structured to support setting of an operation condition of a plant; and
   a learning device structured to learn an index calculation algorithm used in the support device,
   wherein the support device comprises:
   a state value acquirer structured to acquire a plurality of state values representing states of a plurality of controlled devices during operation of the plurality of controlled devices included in the plant;
   a predictor structured to estimate predicted values for the plurality of respective state values at a predetermined future time point based on the plurality of respective state values acquired by the state value acquirer; and
   a notifier structured to, in a case where an index calculated by means of an index calculation algorithm based on a difference between each of the state values at the predetermined time point acquired by the state value acquirer and each of the predicted values at the predetermined time point or a later time point than the predetermined time point estimated by the predictor or a change ratio of the difference satisfies a predetermined condition, provide notification of the case, and
   wherein the learning device comprises:
   an index evaluation acquirer structured to acquire a history of the predicted values for the plurality of state values representing the states of the plurality of controlled devices and actual values and evaluation for operation of a specific controlled device; and
   a learner structured to learn the index calculation algorithm based on the history and the evaluation, and
   wherein the index includes a degree of importance indicating a magnitude of an influence on the specific controlled device and a degree of urgency indicating urgency of an influence on the specific controlled device.

* * * * *